(12) United States Patent
Zhu et al.

(10) Patent No.: US 9,653,727 B2
(45) Date of Patent: May 16, 2017

(54) METAL TIN-CARBON COMPOSITES, METHOD FOR PRODUCING SAID COMPOSITES, ANODE ACTIVE MATERIAL FOR NON-AQUEOUS LITHIUM SECONDARY BATTERIES WHICH IS PRODUCED USING SAID COMPOSITES, ANODE FOR NON-AQUEOUS LITHIUM SECONDARY BATTERIES WHICH COMPRISES SAID ANODE ACTIVE MATERIAL, AND NON-AQUEOUS LITHIUM SECONDARY BATTERY

(71) Applicant: DIC Corporation, Tokyo (JP)

(72) Inventors: Peixin Zhu, Sakura (JP); Hiroshi Kinoshita, Sakura (JP); Takumi Yoshimura, Sakura (JP); Shinji Kato, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/765,962

(22) PCT Filed: Jan. 14, 2014

(86) PCT No.: PCT/JP2014/050441
§ 371 (c)(1),
(2) Date: Aug. 5, 2015

(87) PCT Pub. No.: WO2014/141732
PCT Pub. Date: Sep. 18, 2014

(65) Prior Publication Data
US 2015/0372295 A1    Dec. 24, 2015

(30) Foreign Application Priority Data

Mar. 14, 2013   (JP) ................................. 2013-051791
Mar. 14, 2013   (JP) ................................. 2013-051792

(51) Int. Cl.
*H01M 4/36* (2006.01)
*C01B 31/02* (2006.01)
(Continued)

(52) U.S. Cl.
CPC ............. *H01M 4/366* (2013.01); *C01B 31/02* (2013.01); *H01M 4/133* (2013.01); *H01M 4/134* (2013.01);
(Continued)

(58) Field of Classification Search
CPC ...... H01M 4/366; H01M 4/587; H01M 4/133; H01M 4/387; H01M 4/583; H01M 4/1393; H01M 4/1395; H01M 4/362
See application file for complete search history.

(56) References Cited

U.S. PATENT DOCUMENTS

2009/0297951 A1    12/2009   Katsura et al.
2011/0311873 A1    12/2011   Schulz et al.
2013/0320270 A1*   12/2013   Hwang ................. H01M 4/364
                                                        252/503

FOREIGN PATENT DOCUMENTS

CN    101202340 A    6/2008
CN    102208605 A    10/2011
(Continued)

OTHER PUBLICATIONS

International Search Report dated Apr. 15, 2014, issued in counterpart applciation No. PCT/JP2014/050441 (4 pages).
(Continued)

*Primary Examiner* — Jane Rhee
(74) *Attorney, Agent, or Firm* — Westerman, Hattori, Daniels & Adrian, LLP

(57) ABSTRACT

A metal tin-carbon composite having excellent properties required for various use applications, a method for producing the composite at low cost and in a simple manner, and
(Continued)

use applications of a non-aqueous lithium secondary battery produced using the composite are provided. A metal tin-carbon composite comprising metal tin nanoparticles (B) contained in a sheet-like matrix (A) composed of carbon, wherein the metal tin-carbon composite contains the metal tin nanoparticle (B) having a particle size of a range of 0.2 nm to 5 nm and does not contain a coarse metal tin particle having a particle size of 1 μm or more, a preferable method for producing the composite using a specific precursor, an anode active material for a non-aqueous lithium secondary battery comprising the composite, a negative electrode for non-aqueous lithium secondary battery using the anode active material, and a non-aqueous lithium secondary battery.

4 Claims, 5 Drawing Sheets

(51) Int. Cl.
*H01M 4/587* (2010.01)
*H01M 4/133* (2010.01)
*H01M 4/134* (2010.01)
*H01M 4/38* (2006.01)
*H01M 4/583* (2010.01)
*H01M 4/1393* (2010.01)
*H01M 4/1395* (2010.01)
*H01M 10/0525* (2010.01)
*H01M 4/02* (2006.01)

(52) U.S. Cl.
CPC ....... *H01M 4/1393* (2013.01); *H01M 4/1395* (2013.01); *H01M 4/362* (2013.01); *H01M 4/387* (2013.01); *H01M 4/583* (2013.01); *H01M 4/587* (2013.01); *H01M 10/0525* (2013.01); *H01M 2004/021* (2013.01)

(56) References Cited

FOREIGN PATENT DOCUMENTS

| | | | |
|---|---|---|---|
| JP | 11-104486 | A | 4/1999 |
| JP | 2002-117850 | A | 4/2002 |
| JP | 2004-178922 | A | 6/2004 |
| JP | 2006-269110 | A | 10/2006 |
| JP | 2008-27912 | A | 2/2008 |
| JP | 2010-153346 | A | 7/2010 |
| JP | 2012-164632 | A | 8/2012 |
| JP | 2012-169172 | A | 9/2012 |
| JP | 2014-19607 | A | 2/2014 |

OTHER PUBLICATIONS

Liu et al., "Advanced Materials for Energy Storage", Advanced Energy Materials, 2010, vol. 22, pp. E28-E62.
Hassoun, et al., "A Nanostructured Sn—C Composite Lithium Battery Electrode with Unique Stability and High Electrochemical Performance", Advanced Materials, 2008, vol. 20, pp. 3169-3175.
Kamali, et al., "Tin-Based Materials as Advanced Anode Materials for Lithium Ion Batteries: A Review", Rev. Adv. Mater. Sci., 2011, vol. 27, pp. 14-24.
Lee et al., "Sn nanocrystal/carbon composites as high-capacity anode materials for lithium rechargeable batteries", Journal of Power Sources, Dec. 11, 2011, vol. 196, No. 24, p. 10686-10691.
Extended (supplementary) European Search Report dated Oct. 27, 2016, issued in counterpart European Application No. 14764494.2. (11 pages).
Derrien et al., "Nanostructured Sn—C Composite as an Advanced Anode Material in High-Performance Lithium-Ion Batteries", Advanced Materials, 2007, vol. 19, No. 17, pp. 2336-2340.
Wang et al., "Tin Nanoparticle Loaded Graphite Anodes for Li-Ion Battery Applications", Journal of the Electrochemical Society, 2004, vol. 151, No. 11, pp. A1804-A1809.
Partial Supplementary European Search Report dated Jul. 15, 2016, issued in counterpart European Patent Application No. 14764494.2. (6 pages).
Office Action dated Jul. 5, 2016, issued in counterpart Chinese Patent Application No. 201480011553.5, with partial search report in English. (10 pages).

* cited by examiner

METAL TIN-CARBON COMPOSITES, METHOD FOR PRODUCING SAID COMPOSITES, ANODE ACTIVE MATERIAL FOR NON-AQUEOUS LITHIUM SECONDARY BATTERIES WHICH IS PRODUCED USING SAID COMPOSITES, ANODE FOR NON-AQUEOUS LITHIUM SECONDARY BATTERIES WHICH COMPRISES SAID ANODE ACTIVE MATERIAL, AND NON-AQUEOUS LITHIUM SECONDARY BATTERY

TECHNICAL FIELD

The present invention relates to sheet-like metal tin-carbon composites containing a metal tin nanoparticle and a method for producing the composites, and an anode active material for non-aqueous lithium secondary batteries which is produced by using the composites, a negative electrode for non-aqueous lithium secondary batteries using the anode active material, and a non-aqueous lithium secondary battery.

BACKGROUND ART

Since the carbon material has excellent electrical and chemical properties, the application of the carbon material has been extended to the energy storage devices such as lithium ion batteries, and the electrodes of the electric double layer capacitors. However, the theoretical capacity value of the graphite widely used in the anode materials of the lithium ion secondary batteries or the capacitors is low (372 mAh/g), and the further improvement of the capacity of the anode materials using only graphite is a major problem.

In recent years, as materials in place of graphite, materials such as silicon, tin, and aluminum have been noted since the battery capacity is dramatically improved by alloying the materials to lithium electrochemically (for example, refer to Non-Patent Document 1, Patent Document 1). However, in the non-aqueous electrolyte secondary batteries using the lithium alloy and the like as the anode active materials, the alloy materials of the anode active materials are pulverized when repeating charge and discharge cycles, and the characteristics of the anode active material are remarkably lowered. Therefore, the current situation does not yet reach the full-scale practical realization.

Nanonization of metal particles in the composite materials is said to be a very effective mean for suppression of pulverization of the alloy-based active materials associated with charge and discharge. Therefore, since a carbon composite carrying metal particles of a nanometer order is expected as a next-generation functional material with superior characteristics, research and development with regard to the method for supporting nano-metal in the composite materials have also attracted attention.

The methods for synthesizing the composite materials by mixing fine particles of the metal phase and the carbon phase (fibrous, tubular, porous, etc.) are widely reported (for example, refer to Patent Documents 2 to 5). The Patent Documents 2 to 5 relate to the methods for producing composite particles by using a net-like structure comprising resin carbon materials or nanofibers, etc., and by surrounding-coating fine particles such as a metal, a semi-metal, and an alloy. Since the composite materials obtained by these methods are in a state in which the metal phases and the carbon phases are simply mixed, or they simply adhere, there is a defect in which the metal particles are easily desorbed from the carbon phase.

As a method for effectively compounding metal tin and carbon material, for example, a method for synthesizing tin-carbon composite by calcinating a gel comprising resorcinol-benzene-1,3-formaldehyde and metal tin organic compounds in an argon atmosphere, has been proposed (for example, refer to Non-Patent Document 2). The metal tin in the composite obtained by this method is a nanoparticle having an average particle size of about 36 nm, and they are all included in the carbon material. However, the form of the obtained carbon composite material is entirely irregular, a large variation in the distribution of tin particles is also observed, and it is one that lacks homogeneity.

In addition, a method for producing tin-carbon composite particles by heat treatment after metal ions are absorbed in ion-exchange resins, has been proposed (for example, refer to Patent Document 6). In Patent Document 6, the cation exchange resins which can be ion-exchanged with the metal ion are used, among these, it is described that the cation exchange resins to be used may be one to which the ion-exchange group such as a phenolic hydroxy group, a carboxy group, or a sulfonic acid group binds. Although preparation of the carbon composite material containing fine particles of the metal compound is possible by this method, it is difficult to control the morphology of the composite particles by this method, or to control the particle size of the fine particles of the metal compound at several nano-level. When observing the photographs shown in the Patent Document 6, ones whose particle size is more than 50 nm are included, and it is apparent that its distribution is not controlled.

Non-Patent Document 3 is a review of "the tin-based anode material", which was published in 2011. It refers to the current state of the production method of the tin-carbon composite materials, and charge & discharge characteristics of the anode materials using each composite material are also summarized in detail. The carbon layer coating onto the particles, metal supporting on the carbon fiber or in a nanotube, and the like, are described in a number of research examples which are effective methods for stabilizing the metal tin. However, research report of the sheet-like metal tin-carbon composite that contains metal tin particles has not been described.

The constitution of the sheet-like composite that fully encloses metal tin nanoparticles by carbon materials, well exhibits the protective effect of carbon to the metal tin phase. In addition, it is estimated that it is possible to completely find the size effect of the metal tin nanoparticles by thoroughly eliminating the coarse particles of metal tin in the carbon composite materials. Furthermore, the sheet-like form is advantageous for film-forming properties of the powders, and it is considered to be led to the improvement of the electronic transitions and conductivity. Therefore, a material having such a structure is expected to be applied in a wide range as a new functional material.

PRIOR ART DOCUMENTS

Non-Patent Documents

Non-Patent Document 1: Chang Feng Li, Lai-Peng Ma, and Hui-Mina Cheng, Adv. Mater. 2010, 22, E28-E62.
Non-Patent Document 2: Jusef Hassoun, Gaelic Derrien, Stefania Panero, and Bruno Scrosati, Adv. Mater. 2008, 20, 3169-3175.

Non-Patent Document 3: A. R. Kamali and a J. Fray, Rev. Adv. Mater. Sci. 27 (2011) 14-24.

Patent Documents

Patent Document 1: Japanese Patent Publication No. 2002-117850
Patent Document 2: Japanese Patent Publication No. 2004-178922
Patent Document 3: Japanese Patent Publication No. 2006-269110
Patent Document 4: Japanese Patent Publication No. 2008-027912
Patent Document 5: Japanese Patent Publication No. 2012-164632
Patent Document 6: Japanese Patent Publication No. 2012-169172

DISCLOSURE OF THE INVENTION

Problems to be Solved by the Invention

In view of the above circumstances, the object of the present invention is to provide a metal tin-carbon composite characterized in that the composite contain a plurality of metal tin nanoparticles having a particle size of 0.2 nm to 5 nm in the sheet-like matrix comprising carbon, and does not contain coarse metal tin particles having a particle size of 1 μm or more, and to provide this composite at low cost and in a simple way.

Means for Solving the Problems

As a result of intensive studies to solve the above problems, the present inventors have found that the metal tin-carbon composite containing a plurality of very small metal tin nanoparticles having the size of 5 nm or less in a carbon sheet-like matrix is obtained by calcinating a precursor comprising a metal tin compound, a cationic polymer and sulfuric acid, or by calcinating a precursor comprising a metal tin compound, a cationic polymer, sulfuric acid and a polymer, on this occasion, the composite which does not contain coarse particles of metal tin which are disadvantageous when applied is obtained, and it is possible to control the particle size, content and distribution state of the metal tin nanoparticles by regulating the synthesis and calcinating processes of the precursor, and the present invention has been completed.

That is to say, the present invention provides the metal tin-carbon composite characterized in that the metal tin-carbon composite contains metal tin nanoparticles (B) in the sheet-like matrix (A) comprising carbon, the composite contain the metal tin nanoparticles (B) having the particle size of the range of 0.2 nm to 5 nm, and the composite does not contain coarse metal tin particles having the particle size of 1 μm or more, and provides the simple method for producing of the composite.

Effects of the Invention

The metal tin-carbon composite of the present invention containing a plurality of metal tin nanoparticles having the particle size of the range of 0.2 nm to 5 nm in the sheet-like matrix comprising carbon, wherein the composite does not contain coarse metal tin particles having the particle size of 1 μm or more, is a novel material having a structure which holds the metal tin nanoparticles in the matrix of sheet-like carbon. The method for producing the composite is a simple process in which industrially inexpensive and the readily available metal tin compound is used as a starting material, and the composite is a material that can be expanded to a wide range of applications. The metal tin-carbon composite of the present invention, for example, can be applied as energy-related materials around lithium battery, solar cells, hydrogen storage materials of the fuel cells. In addition, applications such as the catalyst-related exhaust treatment, the organic synthesis are also possible.

In particular, the metal tin-carbon composite containing a plurality of metal tin nanoparticles having the particle size of the range of 0.2 nm to 5 nm in the sheet-like matrix comprising carbon, wherein the composite does not contain coarse metal tin particles having the particle size of 1 μm or more, used as an anode active material in the present invention, can constitute a non-aqueous lithium secondary battery showing a high capacity and excellent cycle characteristics.

BEST MODE FOR CARRYING OUT THE INVENTION

[Metal Tin-carbon Composite]

Figure 1:
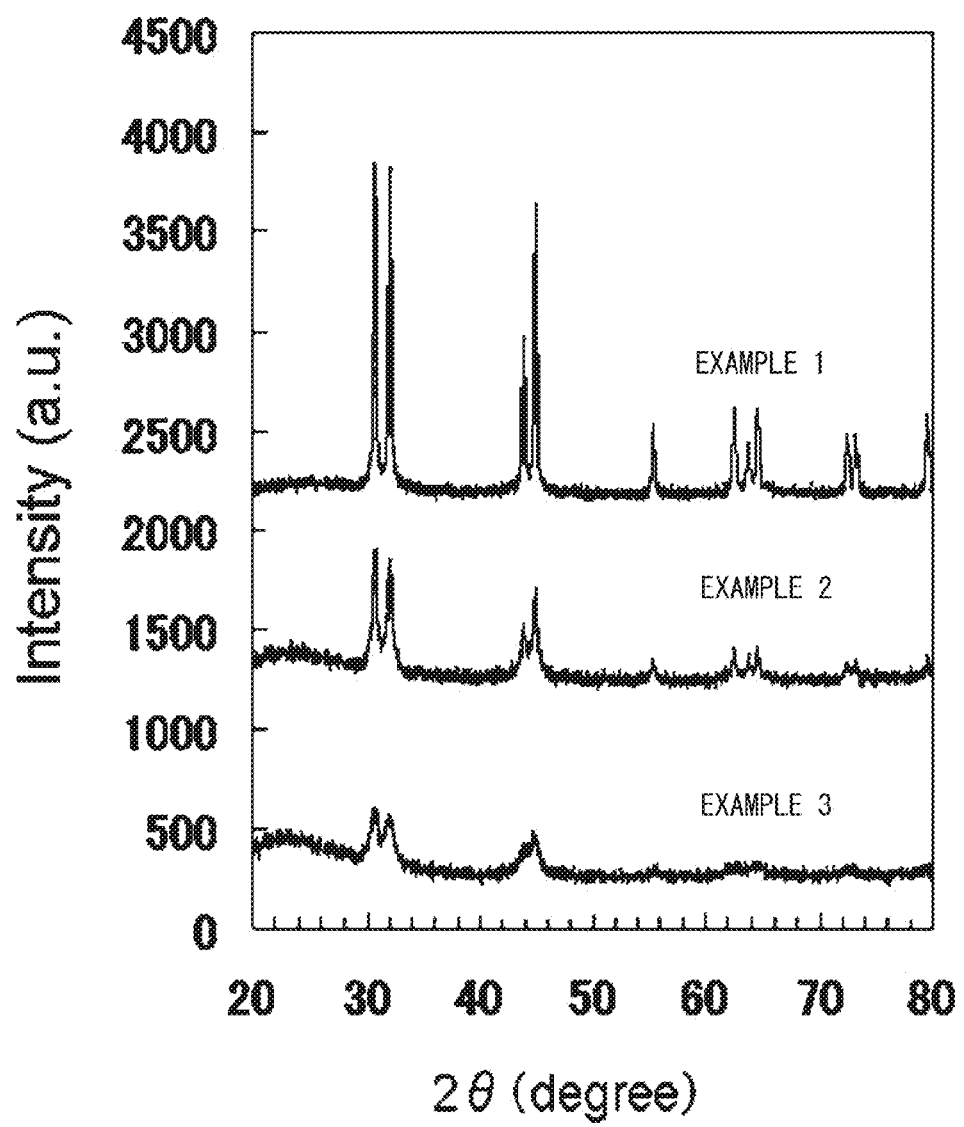
FIG. 1 shows X-ray diffraction patterns of each sample obtained in Examples 1-3.

The metal tin-carbon composite of the present invention is characterized in that the composite contain the metal tin nanoparticles having the particle size of the range of 0.2 nm to 5 nm in the sheet-like carbon matrix, and does not contain coarse metal tin particles having the particle size of 1 μm or more. In addition, the metal tin-carbon composite may contain metal tin nanoparticles having the particle size of more than 5 nm and 500 nm or less in the sheet-like carbon matrix at the same time.

The metal tin particles contained in the sheet-like matrix (A) comprising carbon and their state (particle size, density, content, etc.), greatly affect the performance of the metal tin-carbon composite. Since the metal tin-carbon composite exhibits more excellent performances in characteristics for various applications, for example, when used as the anode active material for lithium secondary batteries, from the viewpoint of the cycle characteristics, the structure containing only the metal tin nanoparticles having the particle size of the range of 0.2 nm to 5 nm is most preferable, however, it may also contain metal tin nanoparticles having the particle size of the range of more than 5 nm and 500 nm or less at the same time in addition to the metal tin nanoparticles having the particle size of the range of 0.2 nm to 5 nm. The particle size of the metal tin nanoparticles contained at the same time in addition to the metal tin nanoparticles having the particle size of the range of 0.2 nm to 5 nm is preferably more than 5 nm and 30 nm or less. Since the coarse metal tin particles having the size of 1 µm or more have a seriously negative effect on the cycle characteristics (due to the collapse or the like of the particles caused by expansion/contraction at the time of performing the repetitive charging and discharging operations), it is necessary that such particles do not exist. In addition, it is preferable that the number of the metal tin particles having the particle size of 500 nm or more is small even if the particle size of the metal tin particles is 1 µm or less.

Furthermore, the content rate of the metal tin nanoparticles (B) in the metal tin-carbon composite is preferably in the range of 5 to 90% as a mass ratio, and when considering that a holding state in which the metal tin nanoparticles (B) contained in the carbon composite are completely isolated with each other in the carbon layer of the sheet-like matrix (A) composed of carbon, and characteristics such as conductive property as the metal tin nanoparticle (B) are efficiently expressed, and the like, the content rate of the metal tin nanoparticle (B) is more preferably in the range of 10 to 60% by mass, and most preferably in the range of 10 to 50% by mass.

In addition, with regard to the metal tin-carbon composite used in the present invention, the carbon continuous phase preferably has a density of a certain amount or more to prevent from falling off of the contained metal tin nanoparticles (B) from the sheet-like matrix (A) comprising carbon, and the specific surface area of the metal tin-carbon composite is preferably in the range of 1 to 500 $m^2/g$. Furthermore, the average thickness of the sheet-like matrix (A) which contains the metal tin nanoparticles (B) is preferably in the range of 5 nm to 150 nm, and the average aspect ratio (average particle size/average particle thickness) is preferably 5 or more, when considering that uniformity of kneading with the binder and coatability are excellent when preparing a negative electrode. Since the structure of the sheet-like metal tin-carbon composite used in the present invention has a high stability, even after the mechanical grinding, although the size of the sheet of the metal tin-carbon composite material becomes smaller, the state in which a plurality of metal tin nanoparticles (B) contained in the primary form of the sheet and the sheet-like matrix (A) is maintained, and no nanoparticles fall off during the production of the negative electrode.

[Method for Producing Metal Tin-carbon Composite]

The metal tin-carbon composite of the present invention containing the metal tin nanoparticles (B) in the sheet-like matrix (A) comprising carbon can be produced by calcinating a precursor comprising a cationic polymer (X), a metal tin compound (Y), and sulfuric acid (Z). By this calcination, the precursor is carbonized and reduced, thereby becoming the metal tin-carbon composite. This calcination may be performed at a constant temperature, may also be performed after calcinating under a constant temperature, further increasing the temperature, and calcinating under a constant temperature. However, when calcination is performed at multiple stages as the latter, it is possible to preferably produce the metal tin-carbon composite by carrying out the final calcination in a non-oxidizing atmosphere.

The metal tin-carbon composite of the present invention containing the metal tin nanoparticles (B) in the sheet-like matrix (A) comprising carbon can be preferably produced by calcinating the precursor comprising a cationic polymer (X), a metal tin compound (Y), and sulfuric acid (Z) at high temperature in a non-oxidizing atmosphere, alternatively, it can be produced by calcinating the precursor at high temperature in a non-oxidizing atmosphere after calcinating the precursor at low temperature in a oxidizing atmosphere.

Of course, at the time of the carbonization and reduction of the precursor, other polymers may be used in combination in addition to the cationic polymer (X) which is the basis of the carbon source if necessary, at any stage as the other carbon source if the carbon contained in the metal tin-carbon composite likely become insufficient. It is particularly important that this carbon is sufficient when the metal tin-carbon composite of the present invention is used as an anode active material of a lithium secondary battery as an application.

With regard to the metal tin-carbon composite of the present invention, it is possible to easily control, for example, the particle size and the distribution of the particle size of the metal tin nanoparticles (B) which are contained in the metal tin-carbon composite, and the content rate of the metal tin nanoparticles (B) by adjusting the synthesis conditions and calcinating conditions of the precursor.

[Cationic Polymer (X)]

As the cationic polymer (X), it is not particularly limited as long as the formation of the precursor containing tin ions is possible by the reaction of metal tin compound (Y) and sulfuric acid (Z). In this case, the synthesis of the precursor may be performed in any medium, aqueous system or solvent system. However, from the viewpoint of the environment and cost, it is preferably carried out in an aqueous system. Therefore, the aqueous cationic polymer is preferable, and the use of the aqueous polyamine is most preferable.

As the cationic polymer (X), the compounds having an amino group ($-NH_2$) such as ammonia, alkyl amine, arginine having more nitrogen, the compounds having a guanidino group or a biguanide group such as guanidine or biguanide derivatives, synthetic polymers having an amino group or imino group in the side chain or the main chain, and polyamino acids (for example, polyornithine, polylysine, etc.) can be used. As the cationic polymer (X), the use of the aqueous cationic polymer is preferable as mentioned above, inter alia, aqueous polyamine is preferable. The polyamine used in the present invention refers to a water-soluble polymer having an amine functional group. The amine functional groups may be any one of the primary, secondary, and tertiary amine, and may be a mixture state of the functional groups.

As the polyamine, polyethyleneimine polyallylamine, polyvinylamine, polylysine, chitosan, polydiallylamine, poly(N-dimethylaminoethyl(meth)acrylate), poly(N-diethylaminoethyl(meth)acrylate), poly(4-vinylpyridine), poly(2-vinylpyridine), poly[4-(N,N-dimethylaminomethylstyrene), and the like, which are generally and industrially widely used, can be preferably used.

Among them, since polyethyleneimine is industrially easily available, has excellent chemical stability, and strongly coordinates with metal ions, it can be particularly preferably used. Although there is no particular limitation with regard to the molecular weight of the polyamine, usually, the polyamines whose number average molecular weight is in the range of 1,000 to 1,000,000 are used, the polyamines whose number average molecular weight is in the range of 5,000 to 100,000 are preferably used. In addition, these polyamines are water-soluble as described above, namely in the case of using the polyamines as the aqueous solution, they are preferably uniform solutions at the used temperature, in particular, they are most preferably uniform solutions at the room temperature (in the range of 20 to 30° C.). From the viewpoint of easily handling (viscosity is not excessively high, and the like), it is preferable to adjust the concentration in the range of 2 to 20% by mass. In addition, an organic solvent miscible with water may be used in combination as long as it does not impair the effects of the present invention.

[Metal Tin Compound (Y)]

The metal tin compound (Y) is preferably water-soluble, and the one composed of tin cation and anion and is water-soluble, is particularly preferable. Examples of such metal tin compound include tin sulfate, tin nitrate, tin chloride, tin acetate, and the like, and tin sulfate is particularly preferable. The tin compounds which are not water-soluble, can be applied to the present invention, for example, by adding tin phosphate, tin carbonate, acids or alkaline solution, and dissolving in water.

The metal tin compound (Y) is used as an aqueous solution. Although the concentration of this case is not particularly limited, it is preferable to adjust in the range of 5 to 30% by mass.

[Sulphate (Z)]

The metal tin compound (Y) can generally be dissolved in water. However, since tin ion easily become tin hydroxide by hydration, it is necessary to stabilize the aqueous solution by the addition of sulfuric acid (Z). In this case, sulfuric acid (Z) is preferably added as diluted sulfuric acid. Although the concentration of sulfate ions in the solution after mixing is not particularly limited, from the viewpoint of stability of the solution, it is preferable to adjust in the range of 0.2 to 5 mol/l, and it is more preferable to adjust in the range of 0.4 to 2 mol/l.

[A Step for Obtaining Precursor Comprising Cationic Polymer (X), Metal Tin Compound (Y) and Sulfuric Acid (Z)]

It is possible to precipitate the precursor which is a gummy insoluble gel from the solution by mixing with stirring an aqueous solution of the aforementioned cationic polymer (X), and an aqueous solution of the metal tin compound (Y) stabilized with sulfuric acid (Z) at a temperature in the range of room temperature (20° C.) to 80° C. In order to efficiently precipitate the precursor, an aqueous solvent (for example, ethanol, methanol, etc.) may be added. This precursor is not dissolved by heating in water, and it does not dissolve in other organic solvents.

The precursor is composed of a cationic polymer (X), tin ion, and sulfate anion. Among them, tin ion and sulfate anion interacts with an amino functional group, and the like, in the cationic polymer (X), to form a crosslinked structure, and become insoluble gel. Specifically speaking, in the case of the sulfate anion, by the pH value becoming acidic side in the solution, the amino groups in the cationic polymer (X) are protonated in the aqueous solution, the cationic polymer (X) behaves as a polycation, and the sulfate anion forms the crosslinked structure by electrostatic interactions with the polycation. Furthermore, tin ions are coordinated with the amino functional groups in the cationic polymer (X), when the coordinate bonds occur between the molecules of the cationic polymers (X), the gel structure can be generated. As a result of such interaction, tin ions and the sulfate anions used in mixing are contained uniformly in the gel-like precursor.

In the step of obtaining an insoluble gel precursor, the molar ratio of the amino groups in the cationic polymer (X) and the tin ions is preferably set to the range of 10:1 to 1:1. In order to obtain a high yield of precursor which is stable insoluble gel, it is more preferable to set the molar ratio to the range of 1:1 to 5:1.

In the step of obtaining the gel precursor, since crosslinking reaction between the cationic polymer (X) molecule and anion is fast, mixing method and rate of the both reactants, and stand and aging of the product give a great influence to the uniformity of the precursor structure.

Therefore, when synthesizing the precursor, it is preferable to mix the reactants using a quantitative liquid feed pump. Although the feed rate is not particularly limited, it is preferable to set to the range of 100 ml to 2000 ml/h. In the following precursor synthesis steps, unless otherwise specified, the mixing of the reactants is carried out under the conditions using the quantitative liquid feed pump.

Moreover, in order to uniform and stabilize the precursor structure, it is preferable that the gel-like precursor obtained from the cationic polymer (X), the metal tin compound (Y) and sulfuric acid (Z) is allowed to stir for 1 hour or more at room temperature, then stood and aged for 5 hours or more in the reaction solution, and aging for 24 hours or more is more preferable.

The precipitated precursor easily becomes agglomerated mass in water, and it is possible to remove the supernatant by decantation, and wash by adding distilled water, ethanol, or a solvent such as acetone. It is also possible to be in powder form by drying the insoluble gel precursor after washing at room temperature or under heating at 60 to 90° C.

The powdered precursor shows a glass transition temperature in the temperature range of the room temperature or higher. That is to say, the precursor comprising the cationic polymer (X), tin ion and sulfate anion is not in a mixed state of foreign matters, it is a substance such as a polymer complex that was formed by accompanied crosslinking based on electrostatic interactions, and therefore, it shows the specific properties as a single substance.

[Polymer (U)]

The precursor is composed of the cationic polymer (X), tin ion, and sulfate anion themselves. However, the vaporization of tin intermediate compound by thermal decomposition cannot be avoided during the high temperature calcination when the carbonization rate from the molecular structure of the cationic polymer (X) after the high temperature calcination under the non-oxidizing atmosphere is low. Therefore, in such cases, the addition of the polymer (U) is important as a new carbon source. It is preferable that the polymer (U) is an aqueous polymer, inter alia, it is preferably a water soluble polymer, from the viewpoint of high affinity with each precursor component.

As the polymer (U) used in the present invention, it is not particularly limited as long as it is possible to be mixed and reacted with the precursor, for example, an aliphatic polymer which is carbonized under high temperature calcination by the action of the catalyst can be applied. However, in order to improve the carbonization rate, a linear or multibranched aromatic polymer having many cyclic unsaturated functional groups typified by the benzene nucleus which is easily carbonized is preferable.

A linear or multibranched aromatic polymer or aliphatic polymer having a hydroxyl group, a carboxyl group, a sulfonic acid group, and the like, which can be chemically bonded to the amino group is preferable since polyamine is preferable for the synthesis of the precursor.

As the polymer (U), phenolic resins, polyacrylate resins, polyalcohol resins, and the like, which are generally and industrially widely used, can be preferably used. In addition, petroleum pitch, coal pitch, furan resins, epoxy resins, and polyacrylonitrile can also be exemplified as graphitizable material or non-graphitizable material.

As the molecular weight of the polymer (U), it is not particularly limited if there is no problem in handling. Furthermore, an aqueous polymer is preferable since aqueous environment is preferable for the synthesis of the precursor. From the viewpoint of easily handling (viscosity is not excessively high, and the like), it is preferable to adjust the concentration in the range of 10 to 100% by mass. Moreover, as long as it does not impair the effects of the present invention, organic solvents miscible with water may be used in combination.

[Treatment Process of Precursor with Polymer (U)]

The precursor is insoluble gel-like by a reaction of the cationic polymer, the tin compound and sulfuric acid. It is possible to remove the supernatant by decantation, and wash by adding distilled water, ethanol, or a solvent such as acetone after the centrifugal separation of the reaction solution.

The container of the insoluble gel-like precursor is placed in a water bath kept at a constant temperature, then the polymer (U) solution is added to the precursor and mixed. As the mixing method, it is not particularly limited as long as the precursor of the present invention and the polymer (U) are sufficiently dispersed, mixing method by a stirrer such as a homodisper, a homogenizer, and the like, can be employed. In addition, although temperature of the water bath and stirring time are not particularly limited, it is preferable that the temperature of the water bath is set in the range of 30° C. to 90° C., and the stirring time is set to 1 hour or more.

When the polymer (U) has a hydroxyl group, a hydroxyl group, a carboxyl group, a sulfonic acid group, and the like, a new structure is produced since they form chemical bonds with amino functional groups of the polyamine molecule which constitute the precursor, and it is possible to entangle the molecule of the polymer (U) with the network of the precursor.

As the additive amount of the polymer (U), it is preferable that the relative additive amount of the polymer (U) with respect to the fully dried precursor weight (ratio by weight) is in the range of 0.05:1 to 3:1, and it is more preferable to be in the range of 0.1:1 to 1:1, according to the microstructure state of the tin-carbon composite obtained after the calcination.

The metal tin-carbon composite may be made from the precursor obtained in the above-described manner by calcination. It is preferable that this calcination is carried out at 200° C. or more, inter alia, in the range of 250 to 1300° C. As described above, the calcination may be carried out at a constant temperature, but may be carried out in multiple stages at stepwisely raised temperature. As described later, when performing calcination at multiple stages, the temperature difference between the two calcinations is preferably set to 50° C. or more, inter alia, 250° C. or more.

[Main Calcination Step for Obtaining Metal Tin-Carbon Composite by Calcination of Precursor]

By calcinating the above obtained precursor, tin ion in the precursor become a particle of metal tin, and the cationic polymer (X) is complexed to carbon by carbonization. In the present invention, this high temperature calcination is referred to as the main calcination step.

The calcination is preferably carried out under non-oxidizing atmosphere, and particularly preferably carried out under an inert gas atmosphere such as nitrogen or argon. The heating temperature of the calcination is desirably set appropriately to 500 to 1300° C. The temperature rise may be reached desired temperature in a straight line manner with a constant rate of rise per unit time. However, in order to accelerate the foaming during heating, it is preferable that the increase to the desired temperature via a step-by-step process after keeping the heating temperature in the vicinity of the foaming point of the precursor for a certain time. Furthermore, at any temperature rise, it can be converted into the sheet-like carbon composite containing metal tin. The time of calcination under the non-oxidizing gas atmosphere is preferably set to the range of approximately 1 hour to 10 hours, but it also relates to the temperature.

That is to say, in order to obtain the composite of metal tin and carbon, it is preferable that the precursor obtained in the above is calcinated at high temperature under the non-oxidizing atmosphere. Above all, the method of heating the precursor under the condition of the temperature of 700° C. or more in the non-oxidizing atmosphere is preferable.

In the above production method, by the addition of sulfuric acid (Z) used in obtaining the precursor, there is an effect of increasing the carbonization ratio of cationic polymer (X) in addition to an effect of stabilizing the solution of the metal tin compound. C—N bond of the cationic polymer (X) molecules tears by pyrolysis in the non-oxidizing atmosphere at high temperature, thereby forming an unstable intermediate molecule having carbon double bond (C=C). At this time, since sulfur atom or sulfur compound in the system introduced by the addition of sulfuric acid (Z) has catalytic function of converting the carbon double bond (C=C) to the cyclic structure of graphite, the carbonization process of cationic polymer (X) is significantly promoted.

However, when the precursor is calcinated at high temperature in the non-oxidizing atmosphere, the intermediate product such as tin sulfide is formed in a large amount at the same time as the thermal decomposition of organic component and sulfuric acid, and volatilizing together with the nitrogen gas sometimes leads to the cause of the loss of tin during the high temperature calcination.

The addition process of the easily carbonized polymer (U) to the precursor improves the carbonization rate by carbonizing the organic components surrounding the tin ion by high temperature calcination in the non-oxidizing atmosphere, and it is possible to suppress the volatilization of the intermediate product such as tin sulfide by increasing the carbon density.

In order to improve the carbonization rate of the metal tin-carbon composite to be obtained, the method of calcinating the precursor at low temperature and subsequently calcinating at high temperature is a very effective method.

[Preliminary Calcination Step]

As described above, in the above calcinating step of the precursor the intermediates such as tin sulfide are sometimes generated. Generation of these intermediates is a major cause for the loss of tin and the generation of impurities. In order to suppress the generation of the intermediates such as tin sulfide, calcinating at low temperature in the oxidizing atmosphere is one of the effective means. This calcination at low temperature is referred to as the preliminary calcination step in the present invention.

The preliminary calcination step is carried out in the oxidizing atmosphere at a constant temperature. The low temperature calcination can be carried out, for example, in the temperature range of 250 to 450° C. in the oxidizing atmosphere. In the present invention, the preliminary calcination temperature of 250 to 450° C. and holding time of 10 minutes to 2 hours are preferable, and the preliminary calcination temperature of 300 to 400° C. and holding time of 15 minutes to 1 hour are more preferable.

A portion of the functional groups of the cationic polymer constituting the precursor is cleaved along with the thermal decomposition of the sulfuric acid component under the preliminary calcinating condition, and the polymer intermediate containing unsaturated carbon bond is formed by oxidation reaction. In addition, the tin compound existed in the precursor structure is thermally decomposed, and the nanoscale tin oxide crystallite is generated by combining with oxygen. The tin oxide crystallite is not present in the free standing state, and is incorporated in some bound state with the polymer intermediates containing unsaturated carbon bonds present in large amount in the surroundings.

[Carbon Replenishment Process to Preliminarily Calcinated Product]

The cationic polymer is the only carbon source in the precursor. That is to say, in the case of using polyamine, polyamine provides carbons in the carbonization step. Since it is easy to handle, multibranched polyethyleneimine is often used. From polyethyleneimine, the intermediates having unsaturated carbon bonds due to thermal decomposition are produced in large amount under high temperature. The carbon bonds in unsaturated state are voluntarily converted to cycles under the catalysis of sulfur or sulfur compounds, and the carbonization reaction occurs, thereby leading to the generation of carbon. A lot of large particles of metal tin are sometimes generated since the effect of carbon phase for suppressing the particle growth of tin is weakened while tin ion is reduced to metal tin, because the sulfate component present in the precursor is reduced rapidly after the preliminary calcination process described above, and the cationic polymer is sometimes partially pyrolyzed, and the amount of carbon sometimes become insufficient when performing the carbonization process at high temperature in this state. Thus, in such a case, replenishment of carbon source is sometimes required after the preliminary calcination of the precursor.

In such a case, for example, it is possible to replenish the carbon source by adsorbing the polymer (V) to the intermediate product obtained by calcinating the precursor at low temperature. Specifically, first, by crushing black expanded body obtained by preliminarily calcinating the precursor, black powder is obtained. The replenishment of carbon source is carried out by putting the black powder in a solution of the polymer (V), and adsorbing the organic component by mixing unders a constant temperature. Although the mixing temperature and adsorption time are not particularly limited, it is sufficient if the preliminarily calcinated product can be completely wetted in the polymer solution and they can be uniformly mixed.

The polymer (V) is used to replenish the carbon source. With regard to the polymer (V), although the same type of the aforementioned polymer (U) may be used, hydrophobic carbon is present as a main component since the preliminarily calcinated product of the precursor is carbonized at low temperature. The polymer (V) used as a carbon replenishment material is preferably non-aqueous, because the polymer (V) molecule used for carbon replenishment is sometimes physically attached to the surface of the preliminarily calcinated product by electrostatic action force or hydrophobic-hydrophilic interactions. Since it is easy to handle, a polymer which is soluble in an alcohol-based solvent is more preferable. When using an aqueous polymer, although the long stirring time is one of the options for uniformly mixing, the combined use of organic solvent that can be mixed with water is preferable.

As the used amount of the polymer (V), it is preferable that the relative amount (weight ratio) of the additive amount of the polymer (V) with respect to the weight of the preliminarily calcinated product is in the range of 0.2:1 to 5:1. Since it is easy to handle, it is preferable that the solution concentration of the polymer (V) is in the range of 5 to 50% by weight in water or organic solvent.

<Preparation of Non-aqueous Lithium Secondary Battery>
[Negative Electrode for Non-Aqueous Lithium Ion Secondary Battery]

The metal tin-carbon composite of the present invention can be used directly as an anode active material for lithium secondary battery. The negative electrode for non-aqueous lithium ion secondary battery of the present invention requires the anode active material for the non-aqueous lithium secondary battery comprising the aforementioned composite and a binder as essential ingredients, and is constituted by containing the other components such as a conductive assistant agent, if necessary. By including the specific composite of the foregoing as an active material, it is possible to constitute the negative electrode for the non-aqueous lithium ion secondary battery having high capacity and excellent cycle characteristics.

The metal tin-carbon composite uniformly contains the metal tin nanoparticles in the sheet-like carbon matrix, and the metal particles are in a state incorporated in the carbon matrix and are fine particles of nano-size. For this reason, even after the repeated charging and discharging as the anode material, pulverization of the metal tin particles is effectively suppressed. Moreover, since the carbon can act as an effective buffering phase, the volume change of the electrode due to expansion and contraction of the metal tin phase at the time of charge and discharge is significantly reduced. Furthermore, since the metal tin-carbon composite has the sheet-like shape, the contact state between the sheet-like composites is good, and the conductivity as the electrode film can be ensured. Consequently, since it is possible to bring out the original performance possessed by the metal tin, it is possible to produce the non-aqueous lithium ion secondary battery having higher capacity and more excellent cycle characteristics than conventional graphite or tin alloy-based material.

A negative electrode for the non-aqueous lithium ion secondary battery is obtained, for example, by kneading the composite mentioned above that is the anode active material for the non-aqueous lithium secondary battery and a binder which is an organic binder with the solvent, by using a dispersing device such as a stirrer, a ball mill, a super sand mill, and a pressure kneader, to prepare a anode material slurry, and forming an anode layer by applying it to the current collector. In addition, it can be obtained by molding the paste-like anode material slurry into the shape of sheet-like, pellet-like, and the like, and integrating with the current collector.

As the binder, it is not particularly limited, for example, styrene-butadiene copolymer; (meth)acrylic copolymers comprising ethylenically unsaturated carboxylic acid esters (e.g. methyl(meth)acrylate, ethyl(meth)acrylate, butyl (meth)acrylate, (meth)acrylonitrile, hydroxyethyl(meth) acrylate, and the like), and ethylenically unsaturated carboxylic acids (e.g. acrylic acid, methacrylic acid, itaconic acid, fumaric acid, maleic acid, and the like); polymer compounds such as polyvinylidene fluoride, polyethylene oxide, poly epichlorohydrin, polyphosphazene, polyacrylonitrile, polyimide, polyamide-imide, and carboxymethyl cellulose are exemplified.

Among these binders, depending on the respective physical properties, there are those dispersed or dissolved in water, dissolved in organic solvent such as N-methyl-2-pyrrolidone (NMP), and any one of them can be used preferably. As the content ratio of the binder in the anode layer in the negative electrode for the non-aqueous lithium secondary battery, 1 to 30% by mass is preferable, 2 to 20% by mass is more preferable, 3 to 15% by mass is even more preferable.

If the content ratio of the binder is 1% by mass or more, the adhesion property is excellent and destruction of the negative electrode caused by the expansion and contraction during charge and discharge is inhibited. On the other hand, if it is 30% by mass or less, it is possible to avoid that the electrode resistance is increased.

In addition, the conductive assistant agent may be mixed with the anode material slurry described above, if necessary. As the conductive assistant agent, for example, carbon black, graphite, acetylene black, oxide or nitride exhibiting conductivity, and the like, are exemplified. The used amount of conductive assistant agent may be about 1 to 15% by mass with respect to the members constituting the negative electrode of the lithium ion secondary battery of the present invention.

Furthermore, as the material and shape of the current collector, they are not particularly limited, for example, those in which aluminum, copper, nickel, titanium, stainless steel, or the like, is formed into belt-like shape such as foil-like, perforated foil-like, mesh-like, and the like, and any one of them can be used. In addition, porous materials, for example, porous metal (metal foam), carbon paper, and the like, can be used.

As the method for coating the anode material slurry to the current collector, it is not particularly limited, for example, various methods such as metal mask printing, electrostatic coating, dip coating, spray coating, roll coating, doctor blade coating, gravure coating, screen printing, and the like, are exemplified. After coating, it is preferable to carry out the rolling treatment by flat press, calender roll, and the like, if necessary.

The integration of the anode material slurry molded into the shape of sheet-like, pellet-like, and the like, with the current collector is, for example, can be carried out by various methods such as roll, press, a combination thereof, and the like.

It is preferable to heat-treat the anode layer formed on the current collector and the anode layer integrated with the current collector in accordance with the used binder species. For example, in the case of using the binder in which the main skeleton is polyimide or polyamideimide, although it possible to heat-treat at 150 to 450° C., it is preferably treated at 150 to 300° C. for preventing oxidation of the metal tin.

By this heat treatment, removal of the solvent and highly strengthening caused by the curing of the binder proceed, thereby improving the adhesion property between the particles and between the particles and the current collector. In addition, it is preferable that the heat treatment is carried out in the inert atmosphere such as helium, argon, nitrogen, and the like, or in the vacuum atmosphere, to prevent oxidation of the current collector during the treatment.

In addition, it is preferable to press (pressing treatment) the anode before the heat treatment. The electrode density of the anode for the lithium ion secondary battery of the present invention is preferably 1.0 to 3.0 g/cm$^3$, more preferably 1.2 to 2.5 g/cm$^3$ and even more preferably 1.3 to 2.0 g/cm$^3$.

[Non-aqueous Lithium Secondary Battery]

The non-aqueous lithium secondary battery of the present invention is characterized in that it uses the active material for the negative electrode of the non-aqueous lithium secondary battery of the present invention described above. For example, it is possible to configure by arranging the negative electrode for non-aqueous lithium secondary battery of the present invention and a positive electrode to face via the separator, and injecting the electrolytic solution.

The positive electrode can be obtained by forming a cathode layer on the current collector surface in the same manner as the negative electrode. In this case of the current collector, those in which the metal or alloy such as aluminum, titanium, stainless steel is formed into belt-like shape such as foil-like, perforated foil-like, mesh-like, and the like, can be used.

As the cathode material used for the cathode layer, it is not particularly limited, for example, the metal compounds, metal oxides, metal sulfides or conductive polymer materials, capable of doping or intercalating lithium ions, can be used, and it is not particularly limited. For example, lithium cobaltate (LiCoO$_2$), lithium nickelate (LiNiO$_2$), lithium manganate (LiMnO$_2$), and these composite oxides (LiCo$_x$Ni$_y$Mn$_z$O$_2$, x+y+z=1), lithium manganese spinel (LiMn$_2$O$_4$), lithium vanadium compounds, V$_2$O$_5$, V$_6$O$_{13}$, VO$_2$, MnO$_2$, TiO$_2$, MoV$_2$O$_8$, TiS$_2$, V$_2$S$_5$, VS$_2$, MoS$_2$, MoS$_3$, Cr$_3$O$_8$, Cr$_2$O$_5$, olivine-type LiMPO$_4$ (M: Co, Ni, Mn, Fe), electrically conductive polymers such as polyacetylene, polyaniline, polypyrrole, polythiophene, polyacene, porous carbon, and the like can be used alone or in mixture.

As the separator, for example, non-woven fabric, cloth, microporous film composed mainly of polyolefins such as polyethylene, polypropylene, or a combination of them can be used. In the case where the positive electrode and the negative electrode of the non-aqueous lithium secondary battery to be manufactured have a structure in which they do not directly contact, it is not necessary to use the separator.

As the electrolytic solution, for example, so-called organic electrolytic solution in which a lithium salt such as LiClO$_4$, LiPF$_6$, LiAsF$_6$, LiBF$_4$, LiSO$_3$CF$_3$ is dissolved in a non-aqueous solvent comprising a single component or the mixture of two or more components of ethylene carbonate, propylene carbonate, butylene carbonate, vinylene carbonate, fluoroethylene carbonate, cyclopentanone, sulfolane, 3-methyl sulfolane, 2,4-dimethyl sulfolane, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, ethyl acetate, and the like, can be used.

Although the structure of the non-aqueous lithium secondary battery of the present invention is not particularly limited, generally, the structure in which the positive electrode and the negative electrode, and the separator provided as necessary, are wound in a flat spiral-like shape, thereby generating the wound type electrode plate group, or they are laminated in a plate-like shape, thereby generating the laminated type electrode plate group, and the electrode plate group is encapsulated in the outer package.

Although it is not particularly limited, the non-aqueous lithium secondary battery of the present invention is used as a paper type battery, a button type battery, a coin type battery, a laminated type battery, a cylindrical battery, prismatic battery, and the like.

The negative electrode of the non-aqueous lithium secondary battery of the present invention described above can be applied to the purpose other than the lithium ion secondary battery, namely, general electrochemical devices in which inserting and desorbing lithium ions is charge and discharge mechanism, for example, in the hybrid capacitor, and the like.

EXAMPLES

Hereinafter, the present invention is explained more specifically using Examples. However, the invention is not limited thereto. Unless otherwise specified, "%" represents "% by mass".

[Analysis by X-ray Diffraction Method]

The isolated and dried sample was placed on the holder for the measurement sample, the holder was set in the wide-angle X-ray diffraction apparatus "Rint-Ultma" manufactured by Rigaku Corporation, and the measurement was carried out under the conditions of Cu/Kα line, 40 kV/30 mA, scan speed 1.0°/minute, scanning range 10 to 80°.

[Differential Scanning Calorimetry]

The isolated and dried sample was weighed by measuring patch, it was set in the differential scanning calorimetry measuring device (TG-TDA6300) manufactured by SII Nano Technology Corporation, and the measurement was carried out in a nitrogen atmosphere or in the air at the temperature range of 20° C. to 1000° C. and the temperature raising rate of 10° C./min. In addition, the sample was set in the differential scanning calorimetry measuring device (EX-STER DSC7200) manufactured by SII Nano Technology Corporation, and the measurement was carried out at the temperature range of the room temperature (25° C.) to 300° C. and the temperature raising rate of 10° C./min.

[Microstructure Analysis by Transmission Electron Microscopy]

The samples dispersed with ethanol were loaded on the sample support film and observed by the transmission electron microscope (JEM-2000FS) manufactured by JEOL Ltd. The high-angle dark-field scattering (scanning transmission electron microscope) method (HAADF-STEM: high-angle annular dark-field scanning transmission electron microscopy) is a method in which electrons that are inelastically scattered to high angle by thermal diffuse scattering due to lattice vibration are received in annular detector, the integral intensity of the electrons is measured as a function of probe position, and the intensity is displayed as an image. The intensity of the image is substantially proportional to the square of the atomic number, although the light atoms are difficult to be seen, the heavy atoms can be selectively observed. The confirmation of the presence state of the metal tin nanoparticles (B) that are contained in the sheet-like matrix (A) composed of carbon was performed using this method.

[Raman Absorption Measurement Analysis]

The powdery sample was put on a glass plate, and the spectrum was measured by the reflection type Raman measurement device (RAMASCOPE, manufactured by Renishaw K. K.).

[Charge and Discharge Measurement]

The charge and discharge test was carried out by a battery charge and discharge measuring device (HJ1001SD8) manufactured by Hokuto Denko Corporation. The measuring condition was room temperature 25° C., constant current (CC method), and voltage range of 0 to 2.5 V.

Synthesis Example 1

Preparation of Precursor Containing Polyamine, Tin Ion and Sulfuric Acid

The aqueous solution of the multi-branched polyethyleneimine (EPOMIN, sp-200, weight average molecular weight of 10,000, manufactured by Nippon Shokubai Co., Ltd.) having the mass ratio of 5% to 15% was prepared, 10 mL of tin sulfate aqueous solution having different molar concentrations indicated in Table 1 was added dropwise to 10 mL of the aqueous solution, and the mixture was stirred vigorously for 1 hour at room temperature (25° C.). In order to dissolve the tin sulfate well in water, diluted sulfuric acid was added to the reaction solution (Table 1). The precipitate from the reaction solution was isolated by a centrifuge (10,000 rpm, 10 min), the supernatant was removed, then it was washed three times with distilled water. The resulting solid was dried under reduced pressure at 90° C. for 10 hours, to obtain a solid powder. The detailed information about each sample is summarized in Table 1.

TABLE 1

| Samples | sp-200/10 ml | SnSO$_4$/10 ml | H$_2$SO$_4$ | Sn/N (molar ratio) | Yields (g) (rate %) |
|---|---|---|---|---|---|
| Sn-0.35a | 10 wt % | 0.812 mol/l | 0.5 mol/l | 0.35:1 | 2.86 (88.3%) |
| Sn-0.47a | 7.5 wt % | 0.812 mol/l | 0.5 mol/l | 0.47:1 | 2.13 (68.4%) |
| Sn-0.70a | 5.0 wt % | 0.812 mol/l | 0.5 mol/l | 0.70:1 | 1.25 (45.0%) |
| Sn-0.233b | 15 wt % | 0.812 mol/l | 0.8 mol/l | 0.233:1 | 3.87 (96.2%) |
| Sn-0.35b | 10 wt % | 0.812 mol/l | 1.0 mol/l | 0.35:1 | 2.45 (65.6%) |
| Sn-0.47b | 7.5 wt % | 0.812 mol/l | 1.0 mol/l | 0.47:1 | 1.91 (54.7%) |
| Sn-0.70b | 5.0 wt % | 0.812 mol/l | 1.0 mol/l | 0.70:1 | 1.1 (34.0%) |

Example 1

<Synthesis of Anode Active Material Comprising Metal Tin-carbon Composite>

The above Sn-0.35a gel precursor was dried overnight in a dryer of 100° C., and further dried for 5 hours at 120° C. under reduced pressure, then the powder of yellow precursor was obtained. The powder was heated at 300° C. or more in nitrogen, a large amount of gas was generated by that the organic component was thermally decomposed with gradually melting the precursor. After heating and foaming at 350° C., it was further calcinated up to 900° C. at 5° C./min of temperature rising rate. Each temperature holding time at target temperature was set to at least one hour. After the calcination, the sample became a black porous body having greatly huge volume due to foaming, and black powder having high specific surface area was obtained after lightly crushing.

The obtained product was observed by SEM and TEM. As a result, it was a sheet-like product, and it was confirmed that metal tin nanoparticles having the particle size of the range of 0.2 to 5 nm were densely distributed in the sheet-like composite according to the HADDF observation. In addition, from TEM and SEM observation, although a small amount of the metal tin particles having the size of 30 to 100 nm in addition to the metal tin nanoparticles having the size of the range of 5 to 30 nm were observed, the metal tin particles having the size of 100 nm or more, especially the coarse metal tin particles having the size of 1 μm or more were not observed.

Figure 2:
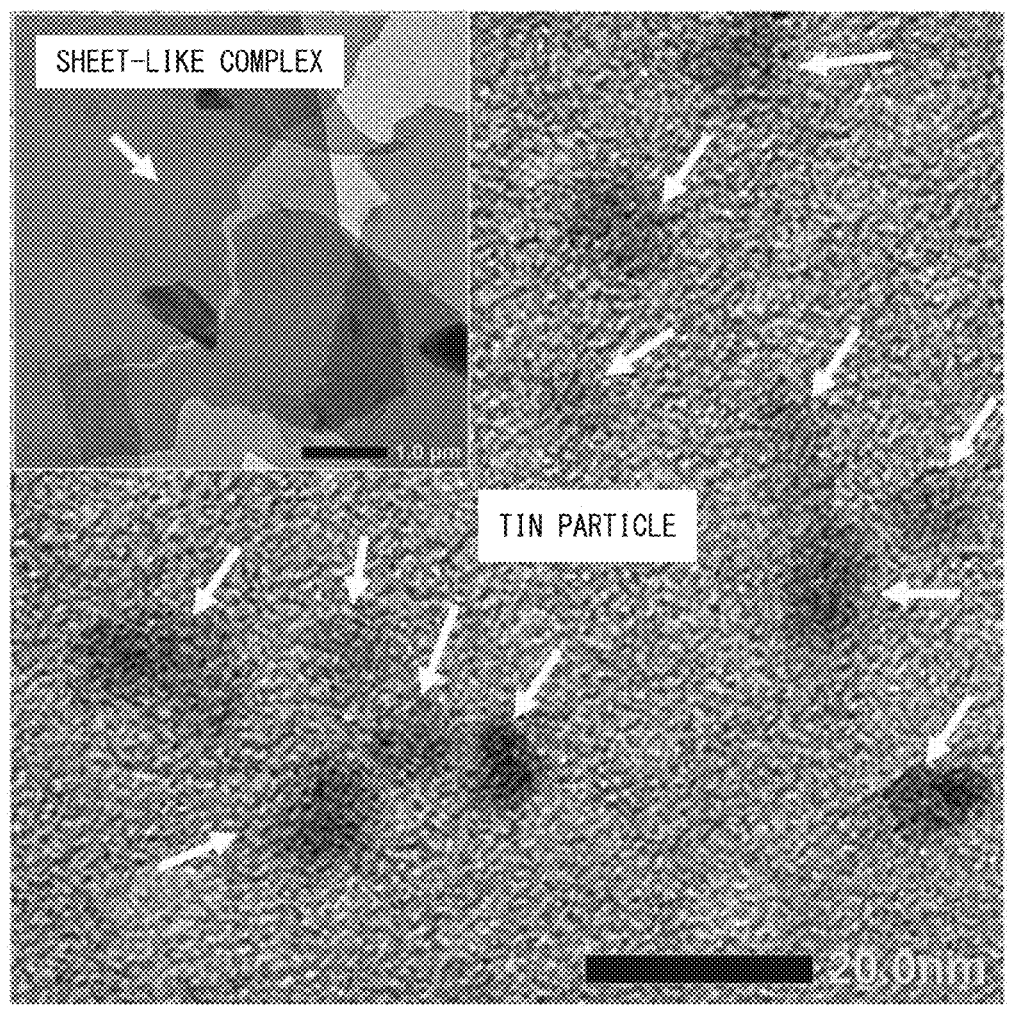
FIG. 2 is a transmission electron microscope (TEM) image of the sample obtained in Example 1.
Figure 3:
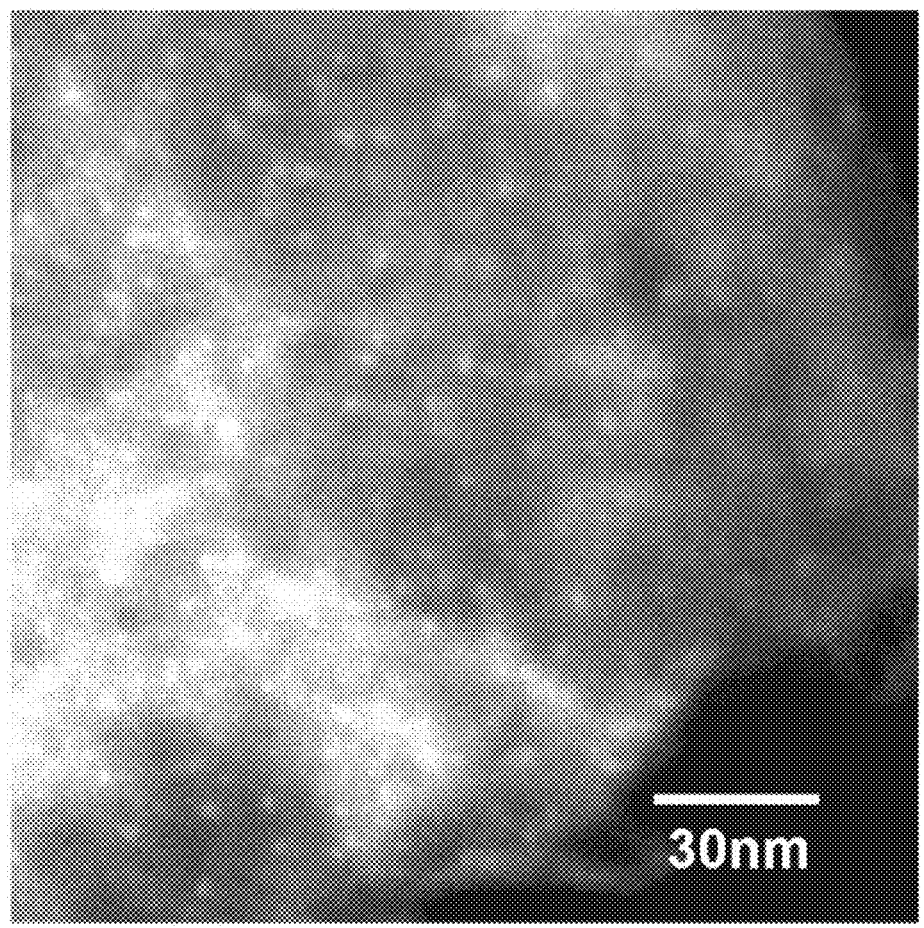
FIG. 3 is a figure showing a distribution state (a result of HAADF-STEM analysis) of tin nanoparticles in the sample obtained in Example 1.
Figure 4:
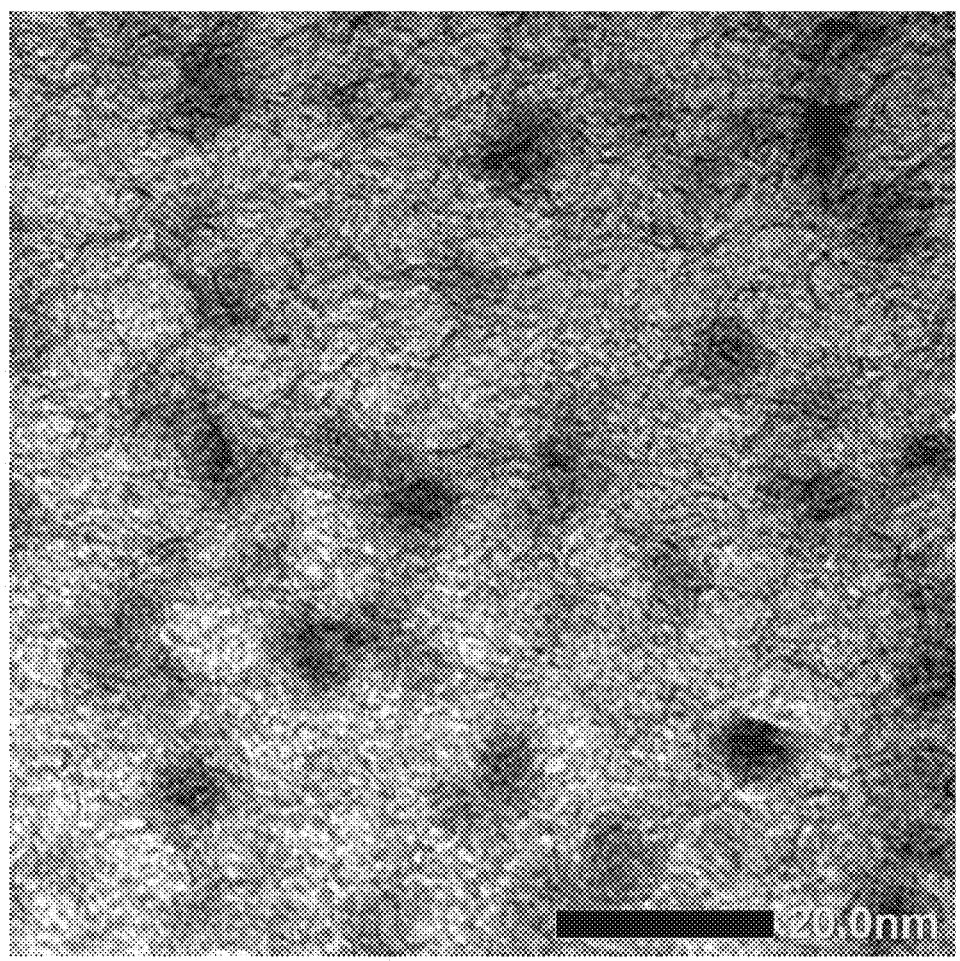
FIG. 4 is a transmission electron microscope (TEM) image of a sample obtained in Example 11.

As a result of thermal analysis, it was shown that the rate of content of metal tin was 57% by mass (Table 2), and it was confirmed that the average particle size of the metal tin nanoparticles was 49.0 nm according to the result of X-ray diffraction pattern. Since stable tin sulfate solution was obtained by addition of diluted sulfuric acid at the time of precursor synthesis, the generation of the metal tin particles having the size of 100 nm or more was significantly suppressed. This is considered to be one of the main reasons that lead to the reduction of coarse metal tin particles. The XRD pattern of the sample obtained in Synthesis Example is shown in FIG. 1. The result of transmission electron microscopic observation (FIG. 2), shows that the form of the sample was sheet-like, and it was found that there were many tin particles having the particle size of about 10 nm in the sheet. Furthermore, the result of HAADF-STEM analysis suggested that a large amount of minimal particles of 1 to 3 nm were contained between the particles having the particle size of about 10 nm (FIG. 3).

(Synthesis of Anode Material and Production of Coin Cell)

The calcinated product using the above metal tin-carbon composite was finely ground under a wet pulverizing condition using ethanol solvent, then, after separation by 25 μm sieve, it was dried under a temperature of 100° C.

1 part of the dried powder, a small amount of acetylene black, a small amount of carboxymethyl cellulose (manufactured by Nippon Paper Industries Co., Ltd.), and 2 parts of water were added and mixed for 5 minutes with rotation revolution mixer. Then, a small amount of commercially available SBR binder resin was added, and thoroughly mixed again for 20 minutes with rotation revolving mixer to obtain a slurry. The slurry was coated onto a copper foil with an applicator (3 MIL) and dried to produce a negative electrode. It was punched in a circle with the diameter of 14 mm, and pressed (press hydraulics 10 MPa), and the evaluation cell was made.

As the coin cell for evaluation, CR2032 type coin cell was used. The negative electrode and metal lithium were opposed via a polypropylene separator of 25 μm, and the coin cell was produced by injecting the electrolytic solution (Kishida Chemical Co. Ltd., 1 mol/L $LiPF_6$, diethyl carbonate:ethylene carbonate=1:1 (volume ratio)). A metal lithium foil was used as the counter electrode.

The charge and discharge test was carried out using the battery charge and discharge measuring device (HJ1001SD8) manufactured by Hokuto Denko Corporation. The measuring condition was room temperature 25° C., constant current 0.3 C (CC method), and voltage range of 0 to 2.5 V. Although the measurement result showed that the initial charge and discharge efficiency was low value of about 61%, it showed a high reversible capacity and excellent cycle characteristics (Table 3). The initial charge and discharge efficiency is shown as a percentage value of the initial reversible charge capacity to the initial discharge capacity. The reversible capacity retention rate is a relative value (%) of the reversible charge capacity to the second charge capacity value.

Example 2

The above Sn-0.47a gel precursor was calcinated at 900° C. in nitrogen by the same operation as Example 1. With regard to the obtained sheet-like product, it was confirmed that the ultrafine tin nanoparticles having the particle size of the range of 0.2 to 5 nm were densely distributed in the sheet-like composite according to the result of HADDF observations, and 100 nm or more, particularly 1 μm or more of the coarse metal tin particles were not present. According to the result of XRD measurement, it was shown that the average particle size of the metal tin nanoparticles was 25.5 nm, and the thermal analysis result showed that the content rate of metal tin was 39% by mass (Table 2, FIG. 1). It was confirmed that the black powder obtained after calcination had excellent conductivity, and it had electrode characteristics due to the metal tin-carbon composite structure.

Example 3

The above Sn-0.70a gel precursor was calcinated at 900° C. in nitrogen by the same operation as Example 1 to obtain a sheet-like product. It was confirmed that the ultrafine tin nanoparticles having the particle size of the range of 0.2 to 5 nm were densely distributed in the sheet-like composite according to the result of HADDF observations, and 100 nm or more, particularly 1 μm or more of the coarse metal tin particles were not present. The average particle size of the metal tin nanoparticles contained in the calcinated product was 9.5 nm, and the rate of content of the metal tin was 38% by mass (Table 2). XRD pattern of the obtained sample is shown in FIG. 1. Production of a coin cell and charge and discharge measurement were carried out in the same manner as Example 1 except using this calcinated product (Table 3).

Example 4

Sn-0.233b gel precursor was synthesized by adding higher concentration of sulfuric acid solution than Examples 1 to 3. After washing and drying, black powder was obtained by calcinating at 900° C. in nitrogen. From the results of XRD and thermal measurement analysis, it was shown that the average particle size of the metal tin nanoparticles was 14.3 nm, and the rate of content of the metal tin was 17.3% by mass (Table 2). The coarse metal tin particles having the particle size of 1 μm or more were not observed when using the reflection electron microscope. The result of transmission electron microscopic observation showed that the form of the obtained sample was sheet-like, and it was found that there were many tin nanoparticles having the particle size of about 10 nm in the sheet. Furthermore, the result of HAADF-STEM analysis showed that a large amount of minimal particles of 1 to 3 nm were contained between the particles having the particle size of about 10 nm. It was confirmed that the black powder obtained after calcination had excellent conductivity, and it had electrode characteristics due to the metal tin-carbon composite structure.

Example 5

The above Sn-0.35b gel precursor obtained by adding higher concentration of sulfuric acid solution than Examples 1 to 3 was calcinated at 900° C. in nitrogen by the same operation as in Example 1, and a sheet-like product was obtained. The average particle size of the metal tin nanoparticles contained in the obtained composite was 10.6 nm, and the rate of content of the metal tin was 19.5% by mass (Table 2). In addition, it was confirmed that there were no coarse metal tin particles having the particle size of 1 μm or more when using the reflection-type electron microscope. The production of a coin cell and charge-discharge measurement were carried out in the same manner as Example 1 except that 2 parts of this calcinated product after grinding and drying, 1 part of commercially available graphite, a small amount of acetylene black, a small amount of carboxymethyl cellulose (manufactured by Nippon Paper Industries Co., Ltd.) and 4 parts of water were added and mixed in rotation revolution mixer, then a small amount of commercial SBR binder resin was added (Table 3).

Example 6

The above Sn-0.47b gel precursor obtained by adding higher concentration of sulfuric acid solution than Examples 1 to 3 was calcinated at 900° C. in nitrogen by the same operation as in Example 1, and a sheet-like product was obtained. The average particle size of the metal tin nanoparticles contained in the obtained composite was 11.4 nm, and the rate of content of the metal tin was 21% by mass (Table 2). In addition, it was confirmed that there were no coarse metal tin particles having the particle size of 1 μm or more when using the reflection-type electron microscope. It was confirmed that the black powder obtained after calcination had excellent conductivity, and it had electrode characteristics due to the metal tin-carbon composite structure.

Example 7

The above Sn-0.70b gel complex obtained by adding higher concentration of sulfuric acid solution than Examples 1 to 3 was calcinated at 900° C. in nitrogen by the same operation as in Example 1, and a sheet-like product was obtained. The average particle size of the metal tin nanoparticles contained in the obtained composite was 9.2 nm, the rate of content of the metal tin was 26% by mass (Table 2). In addition, it was confirmed that there were no coarse metal tin particles having the particle size of 1 μm or more when using the reflection-type electron microscope. It was confirmed that the black powder obtained after calcination had excellent conductivity, and it had electrode characteristics due to the metal tin-carbon composite structure.

Example 8

The precursor was obtained in the same manner as Example 1 except that polyethyleneimine of low molecular weight (EPOMIN, sp-012, weight average molecular weight 1,200, Nippon Shokubai Co., Ltd.) was used instead of polyethyleneimine used in the above Examples (EPOMIN, sp-200, weight average molecular weight 10,000). After that, the precursor was calcinated at a temperature of 900° C. in nitrogen. The obtained product was observed by SEM and TEM. As a result, it was confirmed that the product was sheet-like, and it had a structure in which a plurality of the metal tin nanoparticles were contained in the sheet-like matrix comprising carbon. In addition, it was confirmed that the ultrafine metal tin nanoparticles having the particle size of the range of 0.2 to 5 nm and 5 to 20 nm were densely distributed in the sheet-like composite according to the HADDF observation. Although a small amount of the other metal tin particles having the size of the range of 30 to 100 nm were observed, it was confirmed that the coarse metal tin particles having the particle size of 1 μm or more were not present by using the reflection electron microscope. It was found that the average particle size of the metal tin nanoparticles was 42.0 nm according to the result of X-ray diffraction pattern, and as a result of thermal analysis, it was shown that the rate of content of metal tin was 45% by mass (Table 2). It was confirmed that the black powder obtained after calcination had excellent conductivity, and it had electrode characteristics due to the metal tin-carbon composite structure.

Example 9

The precursor was synthesized in the same manner as Example 1 by using polyallylamine aqueous solution adjusted to a concentration of 15% by mass (average molecular weight 15,000, PAA-15, Nitto Boseki Co., Ltd.) instead of polyethyleneimine used in the above Examples, and adding 0.5 mol/l of diluted sulfuric acid, followed by adjusting the molar ratio of Sn/N to 0.35/1. After drying the reaction product at 100° C. under reduced pressure, the product was calcinated at a temperature of 900° C. in nitrogen. The obtained product was observed by SEM and TEM. As a result, it was confirmed that the sheet-like product was obtained, and it had a structure in which a plurality of the metal tin nanoparticles were contained in the sheet-like matrix comprising carbon. It was confirmed that the ultrafine metal tin nanoparticles having the particle size of the range of 0.2 to 5 nm and 5 to 30 nm were densely distributed in the sheet-like composite according to the HADDF observation, and the average particle size of the metal tin nanoparticles was 36.0 nm according to the result of X-ray diffraction pattern. As a result of thermal analysis, it was shown that the rate of content of metal tin is 34% by mass (Table 2). Furthermore, it was confirmed that the coarse metal tin particles having the particle size of 1 μm or more were not present in the composite according to the result of the reflection electron microscopic observation. It was confirmed that the black powder obtained after calcination had excellent conductivity, and it had electrode characteristics due to the metal tin-carbon composite structure.

Example 10

The same operation as in Example 1 was carried out except that tin nitrate was used instead of tin sulfate in the above Examples. After the gel-like precursor was sufficiently dried at 100° C. under reduced pressure, it was calcinated at a temperature of 900° C. in nitrogen. The obtained composite was observed by SEM and TEM. As a result, it was confirmed that it was a sheet-like product, and a plurality of the metal tin nanoparticles were contained in the sheet-like matrix comprising carbon. In addition, it was confirmed that the ultrafine metal tin nanoparticles having the particle size of the range of 0.2 to 5 nm and 5 to 30 nm were densely distributed in the sheet-like composite, and the coarse metal tin particles having the size of 1 μm or more were not present according to the HADDF observation. As a result of thermal analysis, it was shown that the rate of content of metal tin was 29% by mass (Table 2), and it was confirmed that the average particle size of the metal tin nanoparticles was 38.0 nm according to the result of X-ray diffraction pattern. It was confirmed that the black powder obtained after calcination had excellent conductivity, and it had electrode characteristics due to the metal tin-carbon composite structure.

TABLE 2

| Examples | Form of sample | Particle of 0.2 to 5 nm | Particle of 5 to 30 nm | Particle of 30 to 100 nm | Large particle of 100 to 500 nm | Large particle of 500 nm to 1 μm | Large particle of 1 μm or more | Average particle size of metal tin (nm) | Content rate of metal tin phase (mass ratio) |
|---|---|---|---|---|---|---|---|---|---|
| Example 1 | Sheet-like | ○ | ◎ | Δ | X | X | X | 49 | 57% |
| Example 2 | Sheet-like | ○ | ◎ | X | X | X | X | 25.5 | 39% |
| Example 3 | Sheet-like | ○ | ◎ | X | X | X | X | 9.5 | 98% |
| Example 4 | Sheet-like | ○ | ◎ | X | X | X | X | 14.3 | 17.3% |

TABLE 2-continued

| Examples | Form of sample | Particle of 0.2 to 5 nm | Particle of 5 to 30 nm | Particle of 30 to 100 nm | Large particle of 100 to 500 nm | Large particle of 500 nm to 1 μm | Large particle of 1 μm or more | Average particle size of metal tin (nm) | Content rate of metal tin phase (mass ratio) |
|---|---|---|---|---|---|---|---|---|---|
| Example 5 | Sheet-like | ○ | ◎ | X | X | X | X | 10.6 | 19.5% |
| Example 6 | Sheet-like | ○ | ◎ | X | X | X | X | 11.4 | 21% |
| Example 7 | Sheet-like | ○ | ◎ | X | X | X | X | 9.2 | 26% |
| Example 8 | Sheet-like | ○ | ◎ | X | X | X | X | 42 | 45% |
| Example 9 | Sheet-like | ○ | ◎ | X | X | X | X | 36 | 94% |
| Example 10 | Sheet-like | ○ | ◎ | X | X | X | X | 38 | 29% |

Footnote of Table 2: The number of tin particles contained per unit area (100 nm×100 nm) in TEM photograph is described below.
Δ (small amount: 0 to 5)
○ (usual: 5 to 15)
◎ (many: 15 or more)
X (none)

Example 11

The Sn-0.233b gel precursor was synthesized by adding relatively high concentration of sulfuric acid solution in the same manner as Example 4. At room temperature, 1.745 g of tin sulfate powder was completely dissolved in 10 ml of 0.8 mol/L diluted sulfuric acid solution and reacted with 10 ml of 15% polyethyleneimine (EPOMIN sp200, molecular weight 10,000, manufactured by Nippon Shokubai Co., Ltd.). After standing for one hour, the supernatant was removed by decantation (4.32 g of dry precursor was obtained after drying). After lightly washed with distilled water, 0.5 g of undiluted solution of aqueous phenol resin (Ferrite 1196, manufactured by DIC Corporation) (relative added amount of the resin to the dry precursor was about 0.1:1) was added and stirred in the water bath of 60° C. for 2 hours. After drying under reduced pressure, this mixture was preliminarily calcinated at 350° C. for 30 minutes in the air, and subjected to a high-temperature calcination and carbonization at 900° C. in nitrogen atmosphere. The results of XRD and thermal analysis measurement showed that the average particle size of the metal tin nanoparticles was 29.0 nm, and the rate of content of metal tin was 33% by mass (Table 3). The analysis results of small angle X-ray scattering showed that the particle size distribution range of the tin present in the tin-carbon composite obtained in the this Example was 0.2 to 20 nm, and the central particle size was about 7 nm. In TEM observation, it was also found that the tin particles having the size of 10 nm or less were densely distributed in the tin-carbon composite. It was confirmed that the black powder obtained after calcination had excellent conductivity, and it had electrode characteristics due to the metal tin-carbon composite structure.

Example 12

By the same operation as Example 11, the gel precursor was mixed with 1.0 g of the aqueous phenol resin by changing the additive amount (relative added amount of the resin to the dry precursor was about 0.25:1). According to the results of XRD and thermal analysis measurement, the average particle size of tin particles in the tin-carbon composite obtained after high temperature calcination in nitrogen atmosphere was 32 nm, and the content of tin was 38% by weight (Table 4). Except for using this calcinated product, production of a coin cell and charge & discharge measurement were carried out in the same manner as Example 1 (Table 3).

TABLE 3

| | Initial discharge capacity (mAh/g) | Initial charge and discharge capacity (%) | Reversible capacity retention rate (charge, 10 cycles) (%) | Reversible capacity retention rate (charge, 50 cycles) (%) |
|---|---|---|---|---|
| Example 1 | 1100 | 61 | 85 | 70 |
| Example 3 | 910 | 58 | 99 | 98 |
| Example 5 | 901 | 59 | 99 | 97 |
| Example 12 | 1200 | 68 | 96 | 90 |
| Example 13 | 905 | 63 | 96 | 91 |
| Example 15 | 1170 | 69 | 93 | 86 |
| Comparative Example 2 | 850 | 80 | 35 | 20 |

Example 13

By the same operation as Example 11, the gel precursor was mixed with 2.0 g of the aqueous phenol resin by changing the additive amount (relative added amount of the resin to the dry precursor was about 0.5:1). According to the results of XRD and thermal analysis measurement, the average particle size of tin particles in the tin-carbon composite obtained after high temperature calcination in nitrogen atmosphere was 26.5 nm, and the content of tin was 20% by weight (Table 4). Except for using this calcinated product, production of a coin cell and charge & discharge measurement were carried out in the same manner as Example 1 (Table 3).

Example 14

The precursor synthesized by the same operation as Example 12 was preliminarily calcinated at 350° C. in the air, and subjected to a high-temperature calcination at 1,000° C. in nitrogen atmosphere. The average particle size of tin present in the obtained tin-carbon composite was 31.9 nm, and the content of tin was 33.8% by weight (Table 4). It was confirmed that the black powder obtained after calcination had excellent conductivity, and it had electrode characteristics due to the metal tin-carbon composite structure.

Example 15

The Sn-0.233b gel precursor was synthesized by adding relatively high concentration of sulfuric acid solution in the same manner as Example 4. At room temperature, 1.745 g of tin sulfate powder was completely dissolved in 10 ml of 0.8 mol/L diluted sulfuric acid solution and reacted with 10 ml of 15% polyethyleneimine (EPOMIN sp200, molecular weight 10,000, manufactured by Nippon Shokubai Co., Ltd.). After standing for one hour, the supernatant was removed by decantation (4.32 g dry precursor was obtained after drying). After lightly washed with distilled water, 10 ml of 15% by weight of polyvinyl alcohol (molecular weight 1,000, relative added amount of the resin to the dry precursor was about 0.3:1) was added and stirred in the water bath of 60° C. for 2 hours. After drying under reduced pressure, this mixture was subjected to a high-temperature calcination and carbonization at 900° C. in nitrogen atmosphere. The results of XRD and thermal analysis measurement showed that the average particle size of the metal tin nanoparticles was 35 nm, and the rate of content of metal tin was 33% by mass (Table 4). Except for using this calcinated product, producdrying, it was subjected to a high-temperature calcination at 900° C. in nitrogen atmosphere. According to the analysis results, the average particle size of the metal tin nanoparticles in the obtained sample was 200 nm, and the rate of content of metal tin was 32% by mass (Table 4). It was confirmed that the black powder obtained after calcination had excellent conductivity, and it had electrode characteristics due to the metal tin-carbon composite structure.

TABLE 4

| Examples | Particle of 0.2 to 5 nm | Particle of 5 to 30 nm | Particle of 30 to 100 nm | Large particle of 100 to 500 nm | Large particle of 500 nm to 1000 nm | Large particle of 1000 nm or more | Average particle size of metal tin (nm) | Content rate of metal tin phase (% by mass) |
|---|---|---|---|---|---|---|---|---|
| Example 11 | ◉ | ◉ | X | X | X | X | 29 | 33 |
| Example 12 | ◉ | ◉ | X | X | X | X | 32 | 38 |
| Example 13 | ◉ | ◉ | X | X | X | X | 26.5 | 20 |
| Example 14 | ◉ | ◉ | X | X | X | X | 31.9 | 33.8 |
| Example 15 | ◉ | ◉ | Δ | X | X | X | 35 | 33 |
| Example 16 | ◉ | ◉ | Δ | X | X | X | 40 | 25 |
| Example 17 | ◉ | ○ | ○ | X | X | X | 80 | 24 |
| Example 18 | ◉ | ○ | ○ | Δ | Δ | X | 200 | 32 | tion of a coin cell and charge & discharge measurement were carried out in the same manner as Example 1 (Table 3).

Example 16

The gel precursor was synthesized in the same manner as Example 4. After standing for one hour, the supernatant was removed by decantation. After lightly washed with distilled water, 20 ml of 15% by weight of polyvinyl alcohol (molecular weight 1,000, relative added amount of the resin to the dry precursor was about 0.6:1) was added and stirred in the water bath of 60° C. for 2 hours. The results of XRD and thermal analysis measurement of the sample obtained by calcinating at 900° C. in nitrogen atmosphere showed that the average particle size of the metal tin nanoparticles was 40 nm, and the rate of content of metal tin was 25% by mass (Table 4). It was confirmed that the black powder obtained after calcination had excellent conductivity, and it had electrode characteristics due to the metal tin-carbon composite structure.

Example 17

The gel-like precursor was synthesized by the same operation as Example 4. After drying, black powder was obtained by preliminarily calcinating at 320° C. in the air for one hour. 1 g of the powder was placed in 10 ml of 10% by weight of phenol resin (TD-2131, manufactured by DIC Corporation)/ethanol solution, and stirred at room temperature for 30 minutes. After removing the supernatant and drying, it was subjected to a high-temperature calcination at 900° C. in nitrogen atmosphere. According to the analysis results, the average particle size of the metal tin nanoparticles in the obtained sample was 80 nm, and the rate of content of metal tin was 24% by mass (Table 4). It was confirmed that the black powder obtained after calcination had excellent conductivity, and it had electrode characteristics due to the metal tin-carbon composite structure.

Example 18

The gel-like precursor was synthesized by the same operation as Example 4. After drying, black powder was obtained by preliminarily calcinating at 400° C. in the air for one hour. 1 g of the powder was placed in 10 ml of 10% by weight of phenolic resin (TD-2131, manufactured by DIC Corporation)/ethanol solution, and stirred at room temperature for 30 minutes. After removing the supernatant and Footnote of Table 4: The number of tin particles contained per unit area (100 nm×100 nm) in TEM photograph is described below.
Δ (small amount: 0 to 5)
○ (usual: 5 to 15)
◉ (many: 15 or more)
X (none)

Comparative Example 1

Synthesis of Composite Material Using Tin Sulfate and Polyvinyl Alcohol 1 g of polyvinyl alcohol (PVA, number average molecular weight 1,000, Wako Pure Chemical Industries, Ltd.) was completely dissolved in 20 ml of distilled water, and stable and uniform solution without precipitate was prepared by adding 20 ml of the concentration of 0.58 M of tin sulfate solution with stirring. After the overnight dehydration of this solution in the dryer of 95° C., dried product was obtained after drying under reduced pressure. Then, the dried product was calcinated in vacuum furnace under condition of 900° C. in nitrogen atmosphere. Gray powder whose volume was significantly shrunken compared to the precursor was obtained. X-ray diffraction pattern showed that the product was tin sulfide and tin oxide ($SnO_{2-x}$), and the metal tin crystal was not detected. As a result of SEM observation, it was confirmed that the form of the calcinated product had no rules.

Comparative Example 2

Synthesis of Composite Material Using Tin Sulfate and Polyethylene Glycol 1 g of polyethylene glycol (PEG, number average molecular weight 20,000, Wako Pure Chemical Industries, Ltd.) was completely dissolved in 20 ml of distilled water, and stable and uniform solution without precipitate was prepared by adding 20 ml of the concentration of 0.58 M of tin sulfate solution with stirring. After obtaining dried product after drying under reduced pressure by the same operation as Comparative Example 1, the dried product was calcinated in vacuum furnace under condition of 900° C. in nitrogen atmosphere. Gray powder whose volume was significantly shrunken compared to the precursor was obtained. Although tin oxide and a small amount of metal tin crystal phase were detected by X-ray diffraction measurement, it was confirmed that the calcinated product was non-regular chunk according to the result of SEM observation. Except for using this calcinated product, production of a coin cell and charge & discharge measurement were carried out in the same manner as Example 1 (Table 3).

Comparative Example 3

Synthesis of Composite Material Using Tin Sulfate and Ion-exchange Resin

Ion exchange was carried out by immersing 20 g of ion-exchange resin A (styrene-divinylbenzene-sulfonic acid group-based (cross-linking degree 8%, ion exchange capacity 2.2 eq/L, exchange group $Na^+$, average particle size 750±50 μm) in 100 ml of aqueous solution of 0.5 mol/L tin sulfate (II) for 60 minutes. Styrene-divinylbenzene-sulfonic acid group-based indicates that long chains of polystyrene are crosslinked with divinylbenzene, and it is a polymeric acid having a sulfo group as ion exchange group. The resin after the ion exchange was washed with ion-exchanged water. After drying, calcination was conducted at 900° C. for 1 hour in nitrogen atmosphere. According to the analysis results such as X-ray diffraction, TEM, the form of the calcinated product had no rules, not only a large number of coarse tin particles (particle size is 1 μm or more) existed in the product, but also the formation of tin oxide particles having the particle size of the range of 40 to 200 nm was detected, and it was confirmed that 40 nm or less, particularly, 5 nm or less of tin particles were not present.

Comparative Example 4

Figure 5:
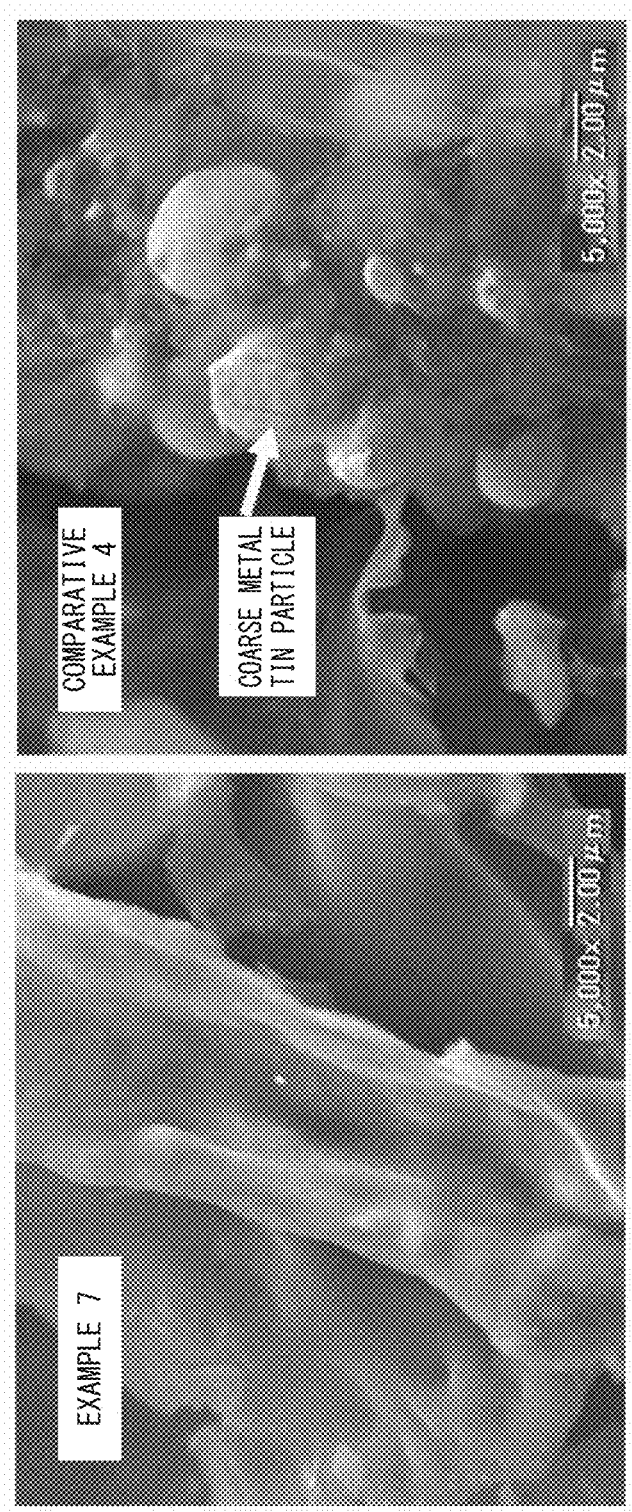
FIG. 5 is a reflection type electron microscope (SEM) image of samples obtained in each condition of Example 7 with the addition of sulfuric acid and Comparative Example 4 without the addition of sulfuric acid.

Synthesis of Composite Material Using Tin Sulfate and Branched Polyethyleneimine without Addition of Sulfuric Acid The Sn-0.7 gel precursor was produced by the same operation as above Example 7 without the addition of sulfuric acid. After washing and drying, black powder of the metal tin-carbon composite was obtained by calcinating up to 900° C. at a temperature rising rate of 5° C./min in nitrogen atmosphere. According to the result of X-ray diffraction measurement, strong and sharp peaks derived from crystal of metal tin were detected, and it was found that the average particle size calculated by the Scherrer equation was 100 μm or more. From the results of SEM and TEM observations, it was confirmed that the all of the composites were sheet-like, although the metal tin nanoparticles having the size of 20 nm or less were contained in the composite, large particles having the size of 100 nm or more, particularly, coarse metal tin particles having the size of 1 μm or more were contained in large amount at the same time (FIG. 5).

INDUSTRIAL APPLICABILITY

Since the metal tin-carbon composite of the present invention can be obtained by a simple process in which industrially inexpensive and readily available metal tin compound is used as a starting material, for example, it can be applied as energy-related materials around lithium battery, solar battery, and hydrogen storage materials of the fuel cell. In addition, it can be also applied to the catalyst-related exhaust treatment, organic synthesis, and the like. Among them, it is possible to constitute the non-aqueous lithium secondary battery showing a particularly high capacity and excellent cycle characteristics.

The invention claimed is:
1. A method for producing a metal tin-carbon composite containing a metal tin nanoparticle (B) in a matrix (A) composed of a carbon characterized in that the metal tin-carbon composite contains the metal tin nanoparticle (B) having a particle size of a range of 0.2 nm to 5 nm and does not contain a coarse metal tin particle having a particle size of 1 μtm or more, wherein a precursor comprising a cationic polymer (X), a tin compound (Y) and sulfuric acid (Z) is calcinated.
2. The method for producing the metal tin-carbon composite according to claim 1, wherein the precursor further comprises a water soluble polymer (U) which is calcinated with the cationic polymer (X), the tin compound (Y) and the sulfuric acid (Z).
3. The method for producing the metal tin-carbon composite according to claim 1, wherein the metal tin-carbon composite further contains the metal tin nanoparticle (B) having a particle size of a range of more than 5 nm to 100 nm at the same time.
4. A method for producing the metal tin-carbon composite according to claim 2, wherein the metal tin-carbon composite further contains the metal tin nanoparticle (B) having a particle size of a range of more than 5 nm to 100 nm at the same time.

* * * * *